Jan. 8, 1952 L. P. FRIEDER ET AL 2,581,645
DELAY OPENING PARACHUTE PACK AND KNIFE
PLUNGER RELEASING ASSEMBLY THEREFOR
Filed July 14, 1949 3 Sheets-Sheet 2
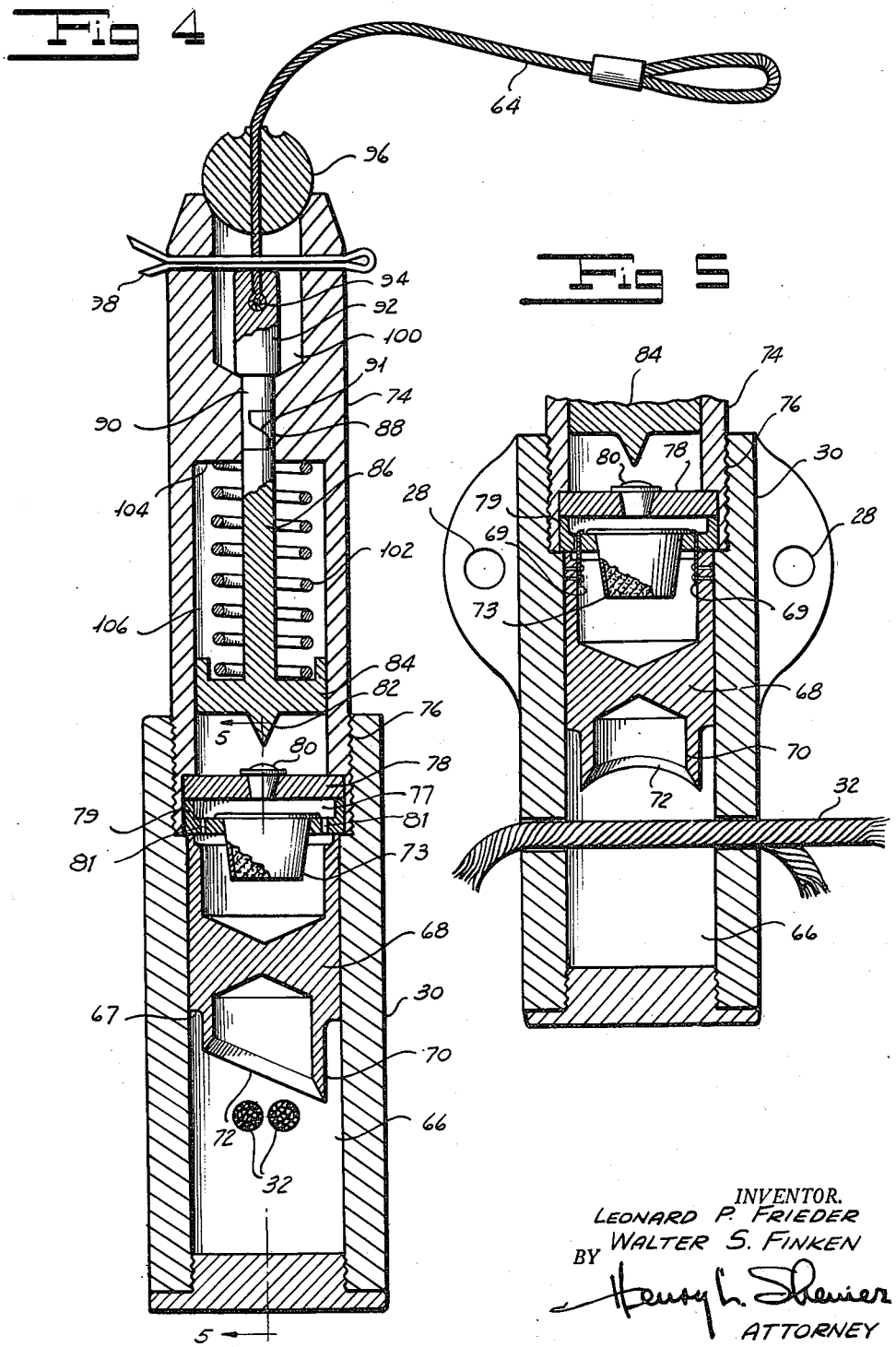
INVENTOR.
LEONARD P. FRIEDER
WALTER S. FINKEN
BY
ATTORNEY Jan. 8, 1952     L. P. FRIEDER ET AL     2,581,645
DELAY OPENING PARACHUTE PACK AND KNIFE
PLUNGER RELEASING ASSEMBLY THEREFOR
Filed July 14, 1949     3 Sheets-Sheet 3
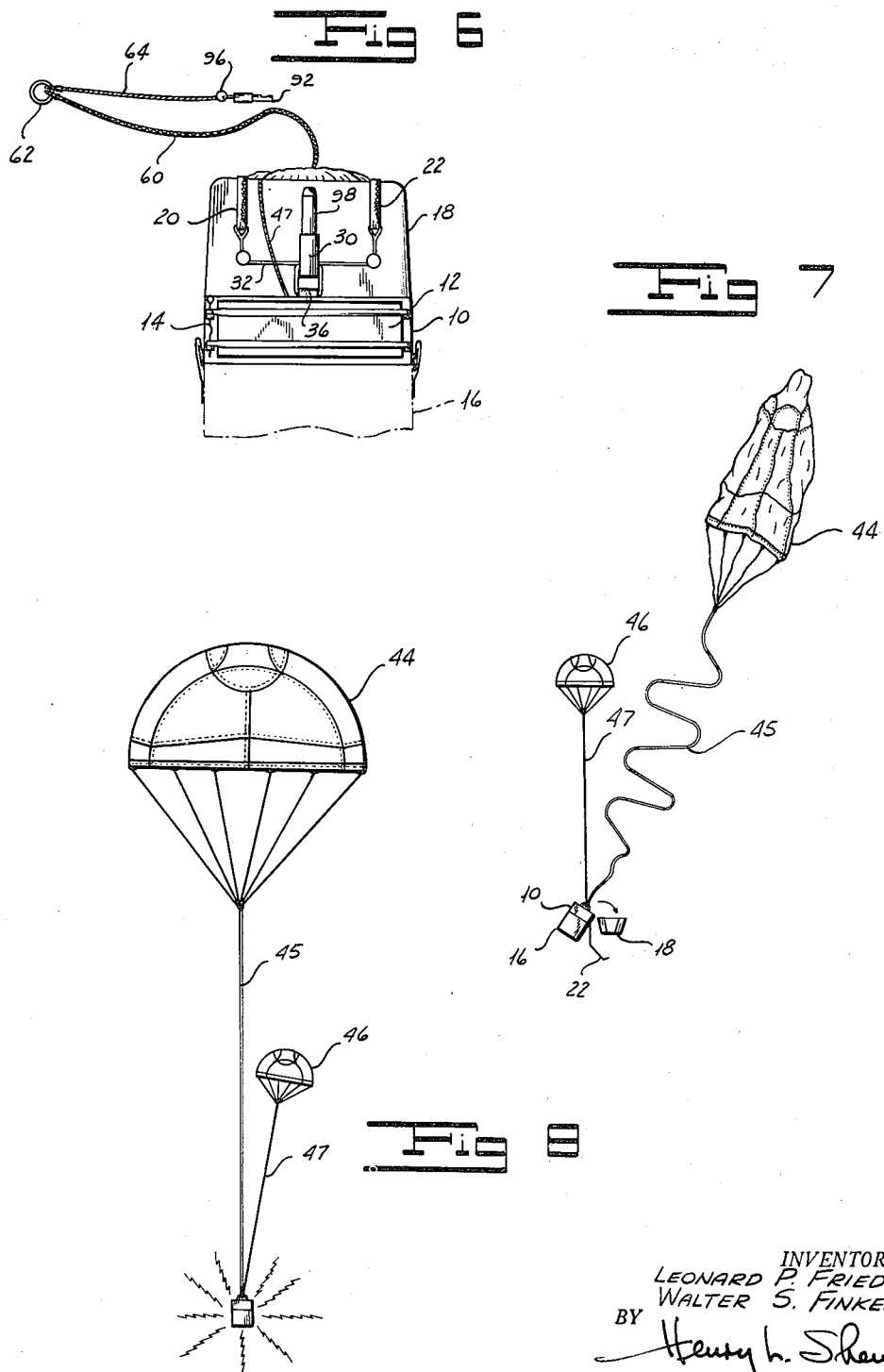
INVENTOR.
LEONARD P. FRIEDER
WALTER S. FINKEN
BY
ATTORNEY Patented Jan. 8, 1952

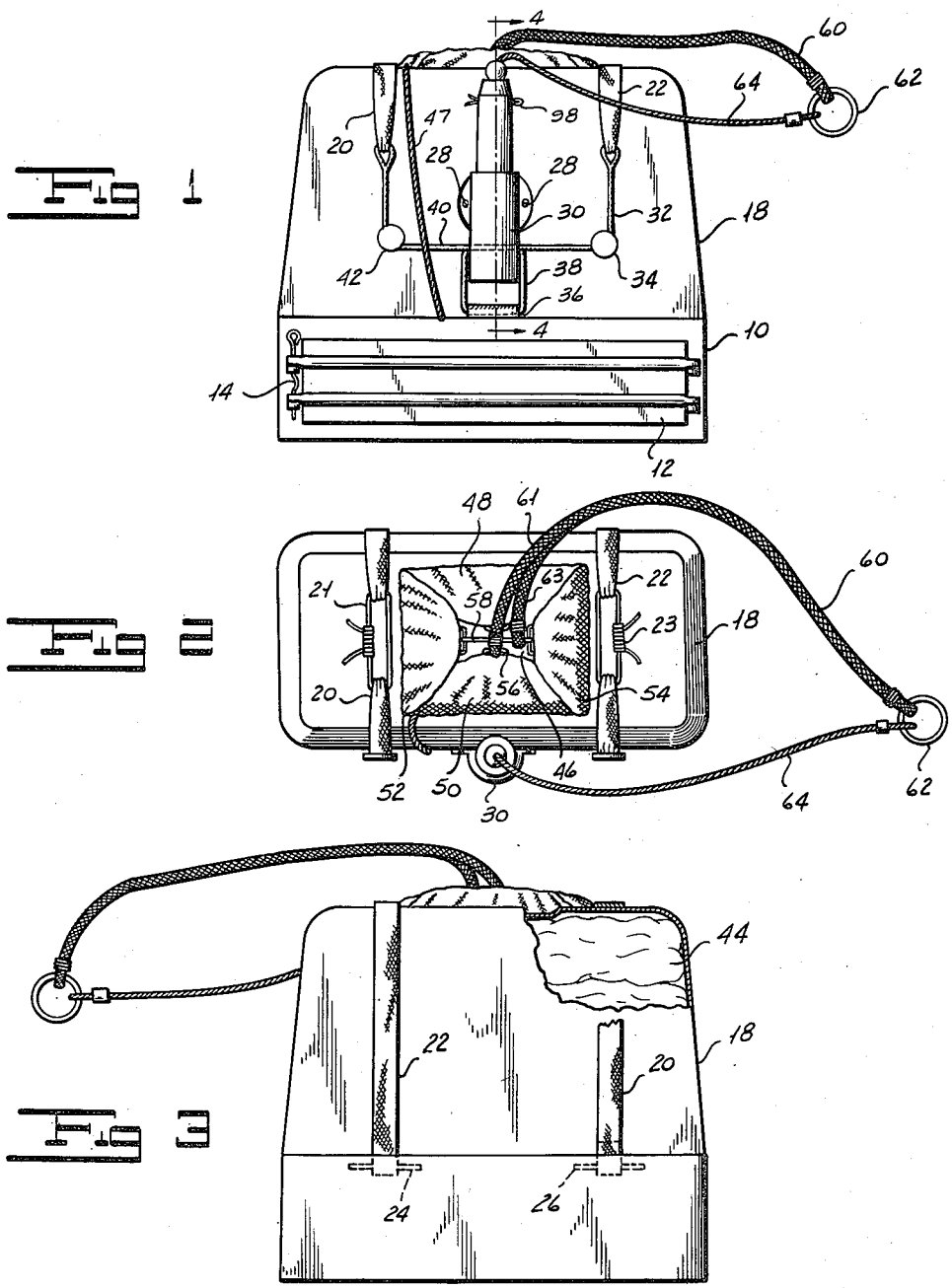

2,581,645

UNITED STATES PATENT OFFICE 2,581,645

DELAY OPENING PARACHUTE PACK AND KNIFE PLUNGER RELEASING ASSEMBLY THEREFOR

Leonard P. Frieder, Great Neck, and Walter S. Finken, Brooklyn, N. Y., assignors, by direct and mesne assignments, to the Reconstruction Finance Corporation, Philadelphia, Pa., a corporation of the United States Application July 14, 1949, Serial No. 104,712

3 Claims. (Cl. 244—149)

Our invention relates to a delay opening parachute pack and knife plunger releasing assembly therefor. This application is an improvement over our copending application Serial No. 786,861 for Delay Opening Parachute Pack and Releasing Assembly Therefor filed November 13, 1947.

It is frequently desirable to drop equipment, apparatus or the like from rapidly moving airplanes by means of parachutes. It is well known that in order to preclude the fouling of the parachute upon the airplane or parts thereof it cannot be opened until it is clear of the airplane and its slip stream. This is usually accomplished by means of a static line which permits the parachute pack to fall a predetermined distance from the airplane before the pack is opened.

With high-speed planes, however, the velocity of the plane is such that initially the parachute pack is traveling at substantially the same speed as the plane, which speed is so high as to introduce opening shocks which may cause parachute failures due to the imposition of abnormal stresses.

These stresses may be successfully overcome by the use of a parachute having a hemispherical canopy and a floating hem cord such as described in United States patent to Walter S. Finken 2,412,892, dated December 10, 1946.

Where, however, delicate instruments are being dropped, it is imperative that the velocity of the pack be reduced before the parachute is opened in order to reduce to a minimum opening shocks which might serve to derange the relatively delicate instruments to be borne by the parachute. For example, there has been developed a radio signaling assembly adapted to transmit radio signals in response to the barometric pressure, the temperature, wind velocity, and the humidity of of the atmosphere. These instruments are employed to obtain weather reports over otherwise inaccessible territory which is not adequately covered by ground stations as, for example, over oceans and in the polar regions. The importance of correct weather data for transoceanic flights cannot be overemphasized. One small airline, for example, making six flights a week between New York and a European port has estimated that by reducing the flight time twenty-five minutes a saving of about $12,000 a month would result principally from fuel economy. The decrease in fuel consumption serves to increase the payload which may be carried in lieu of fuel.

The present system of obtaining weather data employs reports based on personal observations of pilots which information is either incorrect in whole or in part with the result that meteorologists attempt to predict the weather over the route upon data which is frequently conjectural. Airplanes accordingly fly a northern course until bad weather is encountered and are then directed to a southern course. The meteorologists have no means of knowing how long the bad weather existing on the northern course will continue and hence redirect ships to fly the northern course based largely on conjecture.

By the use of the radio weather equipment, transatlantic airplanes may fly the extreme northern course. The pilots may drop radio weather data equipment periodically which will enable meteorologists to predict the weather with a high degree of accuracy, eliminating all conjecture. This method is of high importance not only in civilian aviation but in military uses. It is understood, of course, that absolute reliability is of paramount importance. In order to obtain this reliability, it is necessary that this equipment function at each drop. We have found that we are able to drop sensitive radio weather data gathering equipment by means of the delay opening parachute pack which is the subject of this invention.

In our copending application Serial No. 786,861, we have shown a delay opening parachute pack and releasing assembly therefor in which a powder train adapted to burn a predetermined period of time burned or melted a securing means. We have found that this system works admirably for most altitudes and conditions. At extremely high altitudes, however, where low pressures exist a powder train open to the atmosphere will function erratically. In the instant case the pressure of the gases of combustion of the powder train are confined so that as the train burns pressure will continue to build up, thus offsetting the low pressure of high altitudes and making for certainty in operation.

One object of our invention is to provide a parachute pack which will open only at a predetermined time after being dropped from an airplane within the limits of the time delay mechanism.

Another object of our invention is to provide a novel time delay mechanism which is inexpensive to manufacture and certain in its operation.

Another object of our invention is to provide a time delay parachute pack having a release assembly with few moving parts.

Another object of our invention is to provide a time delay mechanism in which the movement of a plunger under the influence of the pressure of the gases of combustion of a powder train initiates the release action.

Another object of our invention is to provide a delay action release mechanism in which the release is accomplished by the severing of a cord through the action of a plunger moved by the pressure of the gases of combustion of a powder train, which plunger carries a knife adapted to sever the cord.

Other and further objects of our invention will appear from the following description.

For purposes of illustration and not by way of limitation, we will describe our invention as applied to a radio weather gathering instrument adapted to transmit signals relating to information of use to meteorologists, such as the barometric pressure, the temperature of the atmosphere, the velocity of the wind, the humidity of the air and the like. It is to be understood, however, that our time delay parachute pack may be employed for any purpose where it is desired to delay the opening of the parachute for a predetermined interval of time after it is dropped from an airplane.

In the accompanying drawings which form part of the instant specification and which are to be read in conjunction therewith and in which like reference numerals are used to indicate like parts in the various views:

Figure 1 is a front elevation of a delay opening parachute pack in combination with our improved releasing assembly therefor.

Figure 2 is a top plan view of the parachute pack shown in Figure 1.

Figure 3 is a rear elevation of the parachute pack shown in Figure 1.

Figure 4 is a sectional view drawn on an enlarged scale taken along the line 4—4 of Figure 1, showing our improved delay assembly.

Figure 5 is a sectional view drawn on an enlarged scale taken along the line 5—5 of Figure 4.

Figure 6 is a view similar to Figure 1 showing the position of parts immediately after the delay action has been initiated.

Figure 7 is a perspective view showing the position of parts immediately after the time delay assembly has acted to release the main parachute showing it in the process of being streamed.

Figure 8 is a view showing the position of parts with the signalling apparatus in operation borne by the main parachute after it has opened.

In general our invention contemplates the provision of a parachute pack releasably held in assembled position by a frangible member adapted to be severed by a knife which is mounted on a plunger. The plunger is positioned in a cylinder into which gases under pressure are introduced. The time elapsed in bringing the pressure within the cylinder to a predetermined point introduces a desired time delay. The gases as shown are produced by the combustion of a time delay powder train in which a predetermined period of time will elapse before sufficient pressure is built up to allow the knife carried by the plunger to sever the securing member. It is to be understood that any suitable means for feeding a gas under pressure into the cylinder may be employed. For example, a small flask of a compressed gas may be provided with a valve and operated in a manner shown in our copending application, Serial No. 95,222, filed May 25, 1949, to introduce gas under pressure behind the plunger to permit it to move accompanied by the time delay involved in building up sufficient pressure to sever the cord under the action of the draw knife. A static line is attached to the airplane from which our assembly is dropped. The static line contains two forks, one of which initiates the delay action, and the other of which releases a pilot parachute.

More particularly, referring now to the drawings, a base member 10 is formed with a door 12 closed by a pin 14 and is adapted to house batteries for the radio equipment which forms no part of the instant invention and which is housed in a container 16 shown in dotted lines in Figure 6 and carried by the base member 10. A box-shaped member 18 is held to the base by means of a pair of securing members of webbing 20 and 22 which are pinned to the base by means of pins 24 and 26. The box-like cover member 18 carries a housing 30 secured thereto by means of rivets 28. The front of securing member 20 and the front of securing member 22 are held downwardly in tensioned condition by means of a cord or frangible member 32, as can readily be seen by reference to Figure 1. The member 32 passes around a fair lead 34, thence through the delay releasing mechanism and downwardly through a loop 36 of webbing. This loop is secured to the base 10. The member 32 then continues upwardly at 38 and thence through the delay releasing assembly through an opening provided for in the housing 30, as can readily be seen by reference to Figure 4, and outwardly at 40 around fair lead 42 to securing member 20. It will be seen that the cover member 18 is held to the base by securing members 20 and 22. The rear ends of the securing members are secured to the base by the pins 24 and 26. The front ends of the securing members are secured to the base by the cord 32, the lower end of which is passed through the webbing loop 36 which is secured to the base. Two lengths of the cord 32 pass through the casing 30. A main supporting parachute canopy 44 is housed within the top 18 between it and the base 10. A pilot parachute 46 which has a load line 47 connected to the base 10 is assembled on the upper portion of the top 18 within a covering member having four flaps 48, 50, 52 and 54. Flaps 48 and 50 are held together by a frangible cord 56. Flaps 52 and 54 are held together by a frangible cord 58. The static line 60 has a pair of ends 61 and 63 secured to the cords 56 and 58 respectively. The ring 62 is adapted to be secured to the static line attached to the airplane. A lanyard 64 is also secured to the ring 62 and this lanyard initiates the action of the delay release mechanism, as will be pointed out more fully hereafter. The tug upon the line 60 breaks the frangible members 56 and 58 and releases the pilot parachute. The securing member 20 may, instead of being a single member, be formed with two sections tied together by a cord 21, as can readily be seen by reference to Figure 2. Similarly, the securing member 22 may be formed with two sections tied together by a cord 23.

Referring now to Figure 4, the casing 30 is formed with an internal cylinder 66 in which is housed a plunger 68. The plunger is formed with a circular knife 70 having its cutting edge 72 formed on the bias, as can readily be seen in the drawing. It is to be understood that any suitable knife such as a blade formed upon the plunger 68 with its cutting edge disposed at a bias may be employed. A member 79 positioned in the upper portion of the housing 30 carries a delay action powder pellet 73. A cylindrical member 74 is secured by means of screw threads 76 to the upper portion of the housing 30 and is adapted to clamp the member 79 and a bridge 78 in position. Normally the upper surface of the bridge 78 and the lower surface of the member 74 are lapped to form a gas-proof seal. If desired, a sealing gasket may be placed around the periphery of the bridge to insure this. The bridge carries a primer 80 which is adapted to be struck by a firing pin 82 formed on the firing pin piston 84. A firing pin stem 86 formed integrally with the piston 84 has its upper end 88 formed with an S-shaped portion adapted to coact with an S-shaped portion 90 formed on a sear pin 92. One end of lanyard 64 is secured to the upper end of the sear pin 92 through an appropriate opening 94. A sealing ball 96 is formed about the lanyard 64 and is adapted to seal the upper end of the member 74. Not only does the ball seal the cavity 100 but it provides means for releasing the sear 90 under any angular tensioning of the lanyard 64 through the rotary motion of the ball. A cotter pin 98 normally prevents the lanyard from moving the sear 92 which is positioned in an enlarged portion 100 formed in the upper end of member 74. A firing pin spring 102 is positioned between the firing pin piston 84 and the upper wall 104 of a cavity 106 formed within the member 74.

The construction is such that when the lanyard 64 is pulled, the cotter pin 98 having been removed, the first action is to compress the firing pin spring 102 and move the firing pin 82 upwardly. Since the interacting releasable portions at the end 88 of the firing pin stem 86 and the end 90 of the sear 92 are held together while in their bore, the sear and the firing pin stem will move as a unit. As soon as the readily releasable interacting portions reach the enlarged bore 100, however, the sear end 90 will be cammed laterally by the inclined surface 91 and release the firing pin suddenly under the influence of the spring 102. This permits the firing pin 82 to strike the primer 80. It will be observed that the firing pin piston 84 fits loosely to prevent dashpot action in its cylinder 106. The member 79 is cup-shaped so that the bridge 78 rests upon its upper periphery in a position spaced from the delay action powder pellet 73. This construction provides an expansion chamber 77 into which the gases of combustion of the powder pellet may expand. The member 79 is formed with a plurality of channels 81 through which the gases of combustion may pass to exert pressure on top of the plunger 68. These channels, furthermore, permit the equalization of gas pressure on both sides of the powder pellet 73. The provision of the expansion chamber and of the plurality of channels 81 insures a reduction in temperature of the gases of combustion and provides for a more regular rate of burning of the delay action powder pellet, and prevents the ignition of the powder surface of the pellet 73 below the member 79. The upper portion of the plunger is provided with a pair of springs 69 which are secured to the plunger and adapted to extend upwardly through a pair of diammetrically opposed channels 81. These springs are provided with angularly bent heads adapted to hold the plunger 68 in its upward position, as can readily be seen by reference to Figure 5. Locking springs 69 have a dual function. First they hold the plunger 68 in its upward position and prevent any movement due to inertia of the plunger from weakening or severing the cords 32. Secondly they permit the plunger 68 to remain in its upward position until the gas pressure above the plunger is sufficient to move the plunger against the action of the springs deflecting the angularly disposed upper ends of the springs. When this occurs there will be a sudden release of the plunger due to the slippage of the spring from its anchorage insuring that the knife will cut the cords cleanly and suddenly, permitting a more accurate time delay period. The primer ignites the delay powder pellet 73, the gases of combustion of which will exert a progressively increasing pressure on the top of the plunger 68. When the pressure has been built up to a sufficient point, as pointed out above, the plunger will release suddenly and the knife will sever the lengths of the cord 32 to free the cover 18 to release the main parachute 44.

In operation the pack is assembled as shown in Figure 1 with a radiosonde in casing 16 secured to the base 10 as shown in Figure 6. When it is desired to take a sounding a crew member of the carrying airplane deposits the assembly in an air lock provided for this purpose. A static line secured to the airplane is attached to ring 62. When the assembly is launched the static line will first pull the lanyard 64 which is somewhat shorter than the bifurcated member 60. It is understood, of course, that before the pack is placed in the air lock the cotter pin 98 is withdrawn in order to permit the firing mechanism to function. The pull of the lanyard 64 will first cook the spring 102 and then act to release the firing pin as pointed out above. The primer 80 will fire and ignite the delay pellet 73. The combustion of this pellet will produce gases which are imprisoned between the bridge 78 and the plunger 68. Leakage of gases past the bridge 78 is prevented by the seal between the bridge and the lower portion of the member 74. The composition of the powder pellet, that is the speed with which it burns, will determine the delay time. After the delay action has been initiated there will be a tug by the bifurcated member 60 breaking in rapid succession cords 58 and 56, thus releasing the flaps 48, 50, 52 and 54, which will permit the pilot parachute 46 to stream. If desired, the lanyard 64 may be made longer than the lanyard 60, in which case the pilot parachute will be released prior to the firing of the time delay pellet. This may be desirable under certain conditions of high loading or with high speeds. The pilot parachute retards the velocity of the descent of the assembly sufficiently so that when the main canopy 44 is opened the shock will be insufficient to derange the comparatively sensitive instruments in the radiosonde. Then too, the pilot parachute prevents the instrument from assuming a reverse position, thus eliminating a sharp rotation of it which would otherwise ensue upon the opening of the main parachute. As the delay pellet 73 burns it will build up over the delay time sufficient pressure to free the plunger 68 and carry its associated knife 72 to cut the cord 32. The cord 32 is normally under tension of the webbing members 20 and 22 which are secured under tension. As soon as the cord 32 is severed the front cover 18 will pivot away from its base aided in this by the pull upon the load line 47 of the pilot parachute 46, thus permitting the main parachute canopy 44 to stream. The position of the parts at this instant is shown in Figure 7.

As soon as the main parachute is streamed the tug upon its suspension line 45 initiates the action of the radio equipment in housing 16 and sends out signals as known to the art. These signals will depend upon the particular radiosonde and usually relate to wind velocity, temperature, humidity and barometric pressure. The launching aircraft may transmit the geographic position of the drop by latitude and longitude, as well as the altitude from which the radiosonde was launched.

It will be seen that we have accomplished the objects of our invention. We have provided a parachute pack which will open only at a predetermined time after being dropped from an aircraft within the limits of the time delay assembly. We have provided a novel time delay mechanism which is inexpensive to manufacture, certain in its operation and having relatively few moving parts. We have provided a plunger with a knife adapted to move under the influence of fluid pressure generated by the gases of combustion of a time delay powder pellet. The release is accomplished by means of a knife adapted to sever a securing means.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A delay releasing assembly including in combination a cylinder, a plunger positioned within the cylinder, a time delay powder train adapted to generate gases of combustion, a primer for igniting the powder train, means for positioning said primer above said time delay powder train to provide an expansion chamber for the gases of combustion, means providing communication between said expansion chamber and said cylinder behind the plunger, means for releasably immobilizing said plunger, means for firing the primer and means actuated by the movement of said plunger upon release of the immobilizing means for initiating the desired release action.

2. A delay releasing assembly as in claim 1 in which said means for releasably immobilizing said plunger comprises resilient means adapted to yield under a predetermined pressure, the construction being such that the plunger will be released suddenly when the predetermined pressure is reached.

3. A delay releasing assembly including in combination a cylinder, a plunger positioned within said cylinder and formed with a knife extending at an angle to the axis of said cylinder, a powder train, a primer for igniting said powder train, means for positioning said primer in spaced relation to said powder train to provide an expansion chamber for the gases of combustion of said powder train, means providing communication between said expansion chamber and said cylinder above said plunger, readily releasable means for immobilizing said plunger, a piston positioned above said primer, a firing pin carried by said piston, a spring adapted to actuate the firing pin, readily releasable means for immobilizing said firing pin, a severable securing means passing through said cylinder in the locus of the plunger knife upon movement of the plunger under the influence of the pressure of the gases of combustion of said powder train.

LEONARD P. FRIEDER.
WALTER S. FINKEN.

REFERENCES CITED

The following references are of record in the file of this patent:

UNITED STATES PATENTS

| Number | Name | Date |
| --- | --- | --- |
| 1,834,840 | Holt | Dec. 1, 1931 |
| 1,933,694 | Allen | Nov. 7, 1933 |
| 2,073,688 | Freygang | Mar. 16, 1937 |
| 2,140,214 | Temple | Dec. 13, 1938 |

FOREIGN PATENTS

| Number | Country | Date |
| --- | --- | --- |
| 278,695 | Great Britain | Apr. 5, 1928 |